(12) United States Patent
Taira et al.

(10) Patent No.: US 12,693,794 B2
(45) Date of Patent: Jul. 28, 2026

(54) INFORMATION PROCESSING APPARATUS AND CONTROL METHOD

(71) Applicant: Lenovo (Singapore) Pte. Ltd., Singapore (SG)

(72) Inventors: Yusuke Taira, Kanagawa (JP); Takashi Sugawara, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/919,823

(22) Filed: Oct. 18, 2024

(65) Prior Publication Data
US 2025/0190121 A1 Jun. 12, 2025

(30) Foreign Application Priority Data
Dec. 12, 2023 (JP) ................................. 2023-209710

(51) Int. Cl.
*G06F 12/08* (2016.01)
*G06F 3/06* (2006.01)
(Continued)

(52) U.S. Cl.
CPC .......... *G06F 3/0619* (2013.01); *G06F 3/0653* (2013.01); *G06F 3/0659* (2013.01); *G06F 3/0679* (2013.01)

(58) Field of Classification Search
CPC .......................... G06F 12/0844; G06F 12/0862
(Continued)

(56) References Cited

U.S. PATENT DOCUMENTS 8,258,942 B1 * 9/2012 Lanzone ............ G08B 21/0272
340/572.1
10,635,324 B1 * 4/2020 Klein .................... G06F 3/0653
(Continued)

FOREIGN PATENT DOCUMENTS

JP H10-106276 A 4/1998
JP 2004-094987 A 3/2004
(Continued)

OTHER PUBLICATIONS

Extended European Search Report issued in corresponding European Patent Application No. 24199368.2, dated Feb. 4, 2025 (13 pages).
(Continued)

*Primary Examiner* — Mohamed M Gebril
(74) *Attorney, Agent, or Firm* — Osha Bergman Watanabe & Burton LLP

(57) ABSTRACT
An information processing apparatus includes: a solid state drive (SSD) configured with a multi-bit cell for storing multi-bit data in one memory cell and configured to include an electrically rewritable non-volatile storage unit; and a main control unit configured to execute processing based on data stored in the SSD. The SSD includes a storage control unit, which is a storage control unit configured to control access to the non-volatile storage unit, and configured to, when the multi-bit data is stored in the multi-bit cell, store the multi-bit data with a high-quality storage mode in which a variation width of a threshold voltage is narrower than in a normal storage mode when a number of rewrites executed in the multi-bit cell is equal to or greater than a threshold number of rewrites.

6 Claims, 7 Drawing Sheets

(51) Int. Cl.
  G06F 12/0808        (2016.01)
  G06F 12/0815        (2016.01)

(58) Field of Classification Search
  USPC ......................................................... 711/137
  See application file for complete search history.

(56)                    References Cited

U.S. PATENT DOCUMENTS

| | | | | |
|---|---|---|---|---|
| 2003/0151950 | A1* | 8/2003 | Tamada | G11C 11/5635 |
| | | | | 365/185.19 |
| 2006/0007737 | A1 | 1/2006 | Takase et al. | |
| 2007/0253261 | A1* | 11/2007 | Uchida | H04M 1/72409 |
| | | | | 365/189.05 |
| 2015/0131373 | A1* | 5/2015 | Alhussien | G11C 11/5628 |
| | | | | 365/185.02 |
| 2016/0162420 | A1* | 6/2016 | Sekine | G06F 21/79 |
| | | | | 711/103 |
| 2017/0213597 | A1* | 7/2017 | Micheloni | G11C 16/12 |
| 2022/0160487 | A1* | 5/2022 | Ueda | A61C 5/40 |

| | | | | |
|---|---|---|---|---|
| 2022/0405411 | A1* | 12/2022 | Salzman | G06F 21/629 |
| 2025/0022514 | A1* | 1/2025 | Taira | G11C 11/5628 |
| 2025/0190121 | A1* | 6/2025 | Taira | G06F 3/0679 |

FOREIGN PATENT DOCUMENTS

| | | |
|---|---|---|
| JP | 2007-035092 A | 2/2007 |
| JP | 2020-030875 A | 2/2020 |
| JP | 2020-154674 A | 9/2020 |
| JP | 2021-152858 A | 9/2021 |
| JP | 2021-177401 A | 11/2021 |

OTHER PUBLICATIONS

Park et al., "Adaptive Program Verify Scheme for Improving NAND Flash Memory Performance and Lifespan", IEEE Asian Solid-State Circuits Conference, Nov. 2012, pp. 57-60 (4 pages).
Communication pursuant to Article 94(3) EPC issued in corresponding European Patent Application No. 24199368.2, dated Mar. 5, 2026 (7 pages).

* cited by examiner

INFORMATION PROCESSING APPARATUS AND CONTROL METHOD

CROSS-REFERENCE TO RELATED APPLICATIONS

This application claims priority to Japanese Patent Application No. 2023-209710 filed on Dec. 12, 2023, the contents of which are hereby incorporated herein by reference in their entirety.

TECHNICAL FIELD

The present invention relates to an information processing apparatus and a control method.

BACKGROUND

In an information processing apparatus such as a personal computer, in recent years, storage devices equipped with solid state drives (SSDs) instead of hard disk drives (HDDs) have become popular (see, for example, Japanese Patent Application Laid-Open No. 2020-154674). In addition, in order to increase capacity, for example, some SSDs are known to include flash memories that use memory cells (hereinafter, referred to as multi-bit cells) that can store data equivalent to multiple bits in one memory cell, such as multiple level cell (MLC), triple level cell (TLC), and quad level cell (QLC).

Meanwhile, in the information processing apparatus in the related art, although the capacity of the SSD can be increased by using the multi-bit cells, there is a tendency that a data retention (a data retention period) is shortened. In addition, in the multi-bit cells, the more the number of rewrites, which are cycles of erasing and writing data (PE cycle (Program and Erase Cycle)), increases, the shorter the data retention (data retention period) tends to become. Therefore, in the information processing apparatus in the related art, for example, when the user has used the information processing apparatus for a long period of time or when the user is a heavy user who rewrites a large amount of data, the number of rewrites increases, so that there is a possibility that the data retention (data retention period) cannot be guaranteed.

SUMMARY

One or more embodiments of the present invention provide an information processing apparatus and a control method capable of reducing data corruption of an SSD and guaranteeing a data retention period.

An information processing apparatus according to a first aspect of the present invention includes: a solid state drive (SSD) configured with a multi-bit cell for storing multi-bit data in one memory cell and configured to include an electrically rewritable non-volatile storage unit; and a main control unit configured to execute processing based on data stored in the SSD, in which the SSD includes a storage control unit, which is a storage control unit configured to control access to the non-volatile storage unit, and configured to, when the multi-bit data is stored in the multi-bit cell, store the multi-bit data with a high-quality storage mode in which a variation width of a threshold voltage is narrower than in a normal storage mode when the number of rewrites executed in the multi-bit cell is equal to or greater than a threshold number of rewrites.

In addition, in the information processing apparatus according to the first aspect of the present invention, the SSD may include a rewrite number storage unit configured to store the number of rewrites in units of blocks, where the data of the multi-bit cell is erased in a batch, and the storage control unit may be configured to, when the multi-bit data is stored, acquire the number of rewrites corresponding to the block in which the multi-bit data is stored from the rewrite number storage unit, and configured to store the multi-bit data with the high-quality storage mode when the acquired number of rewrites is equal to or greater than the threshold number of rewrites.

In addition, in the information processing apparatus according to the first aspect of the present invention, the storage control unit may be configured to execute, in the high-quality storage mode, an application process of applying a voltage for storing the data to the multi-bit cell for a predetermined period obtained by dividing an application period, a checking process of checking whether or not the threshold voltage falls within the variation width of the threshold voltage, after the application process is performed, and a repeating process of repeating the application process and the checking process until the threshold voltage falls within the variation width of the threshold voltage.

In addition, in the information processing apparatus according to the first aspect of the present invention, the storage control unit may be configured to notify the main control unit that the high-quality storage mode is enabled when the high-quality storage mode is enabled, and the main control unit may be configured to output a notification to a user indicating that the high-quality storage mode is enabled.

In addition, in the information processing apparatus according to the first aspect of the present invention, the main control unit may be configured to display the notification on a display unit when the high-quality storage mode is enabled in a proportion equal to or greater than a predetermined proportion of a storage capacity of the SSD.

In addition, in the information processing apparatus according to the first aspect of the present invention, the main control unit may display, as the notification, information on the display unit indicating the proportion of the storage capacity of the SSD in which the high-quality storage mode is enabled.

In the information processing apparatus, a control method according to a second aspect of the present invention is a control method of the information processing apparatus including a solid state drive (SSD) configured with a multi-bit cell for storing multi-bit data in one memory cell and configured to include an electrically rewritable non-volatile storage unit, and a main control unit configured to execute processing based on data stored in the SSD, the control method includes: a step of causing a storage control unit of the SSD to control access to the non-volatile storage unit, which is a step of storing, when the multi-bit data is stored in the multi-bit cell, the multi-bit data with a high-quality storage mode in which a variation width of a threshold voltage is narrower than in a normal storage mode when the number of rewrites executed in the multi-bit cell is equal to or greater than a threshold number of rewrites.

One or more embodiments of the present invention can reduce data corruption of an SSD and guarantee a data retention period.

DETAILED DESCRIPTION

Hereinafter, an information processing apparatus and a control method according to embodiments of the present invention will be described with reference to the accompanying drawings.

Figure 1:
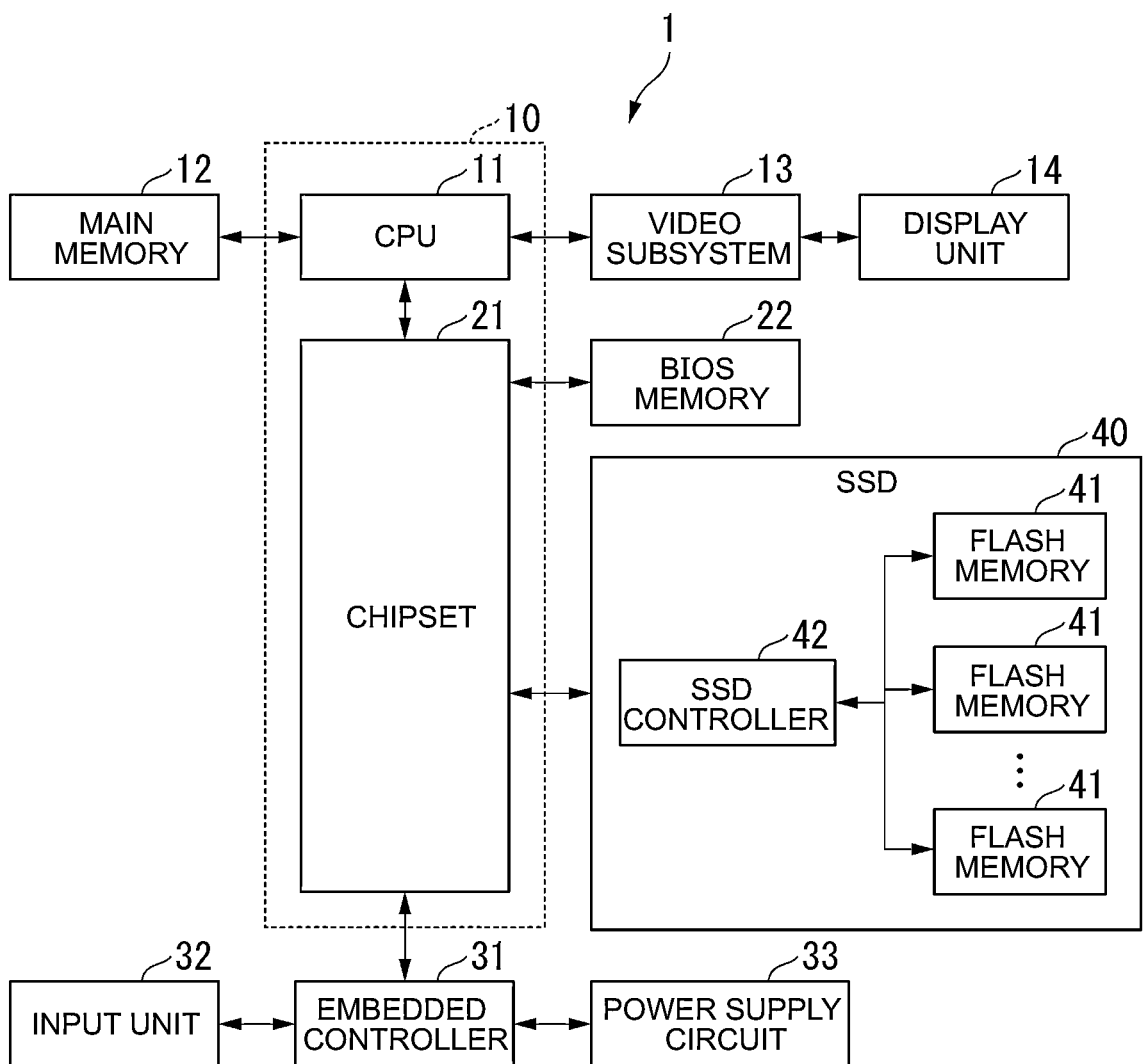
FIG. 1 is a diagram illustrating an example of main hardware configurations of an information processing apparatus and an SSD according to one or more embodiments.

FIG. 1 is a diagram illustrating an example of a main hardware configuration of the information processing apparatus 1 and an SSD 40 according to one or more embodiments.

As illustrated in FIG. 1, the information processing apparatus 1 is, for example, a laptop personal computer, and includes a CPU 11, a main memory 12, a video subsystem 13, a display unit 14, a chipset 21, a BIOS memory 22, an embedded controller 31, an input unit 32, a power supply circuit 33, and the SSD 40.

The central processing unit (CPU) 11 executes various types of arithmetic processing under program control and controls the entire information processing apparatus 1.

The main memory 12 is a writable memory used as a read area for an execution program of the CPU 11 or as a work area for writing processing data of the execution program. The main memory 12 is configured with, for example, a plurality of dynamic random access memory (DRAM) chips. The execution program includes an operating system (OS), various drivers for operating the hardware of peripheral devices, various services/utilities, application programs, and the like.

The video subsystem 13 is a subsystem for realizing a function related to image display and includes a video controller. The video controller processes a drawing instruction from the CPU 11, writes the processed drawing information to the video memory, reads the drawing information from the video memory, and outputs the drawing information as drawing data (display data) to the display unit 14.

The display unit 14 is, for example, a liquid crystal display and displays a display screen based on the drawing data (display data) output from the video subsystem 13.

The chipset 21 includes controllers, such as a universal serial bus (USB), a serial AT attachment (ATA), a serial peripheral interface (SPI) bus, a peripheral component interconnect (PCI) bus, a PCI-Express bus, and a low pin count (LPC) bus, and is connected to a plurality of devices. In FIG. 1, as an example of the device, the BIOS memory 22 and the SSD 40 are connected to the chipset 21. It should be noted that, in one or more embodiments, the CPU 11 and the chipset 21 correspond to a main control unit 10.

The basic input output system (BIOS) memory 22 is configured with, for example, an electrically rewritable non-volatile memory such as an electrically erasable programmable read only memory (EEPROM) or a flash ROM (flash memory). The BIOS memory 22 stores, for example, a BIOS, a system firmware for controlling the embedded controller 31, and the like.

The embedded controller 31 is a one-chip microcomputer that monitors and controls various devices (peripheral devices, sensors, or the like) regardless of a system state of the information processing apparatus 1. In addition, the embedded controller 31 has a power management function of controlling the power supply circuit 33. It should be noted that the embedded controller 31 is configured with a CPU, a ROM, a RAM, and the like (not illustrated), and also includes a plurality of channels of A/D input terminals, D/A output terminals, timers, and digital input/output terminals. For example, the input unit 32, the power supply circuit 33, and the like are connected to the embedded controller 31 via the input/output terminals, and the embedded controller 31 controls the operations of the input unit 32, the power supply circuit 33, and the like.

The input unit 32 is, for example, an input device such as a keyboard or a pointing device such as a touch pad.

The power supply circuit 33 includes, for example, a DC/DC converter, a charge/discharge unit, an AC/DC adapter, and the like, and converts a direct current voltage, which is supplied from an external power or a battery via, for example, the AC/DC adapter, into a plurality of voltages required to operate the information processing apparatus 1. In addition, the power supply circuit 33 supplies electric power to each unit of the information processing apparatus 1 based on the control from the embedded controller 31.

The solid state drive (SSD) 40 is a memory drive device including a rewriteable non-volatile memory and stores an OS, various drivers, various services/utilities, an application program, and various types of data. The information processing apparatus 1 executes various types of information processing by using the data stored in the SSD 40. The SSD 40 is connected to the chipset 21 through, for example, a serial ATA or a PCI-Express bus.

In addition, the SSD 40 includes a plurality of flash memories 41 and an SSD controller 42.

The flash memory 41 is, for example, a NAND flash memory. The flash memory 41 includes, for example, a charge trap type memory cell that stores data by trapping electrons in a charge trap layer or the like without including a floating gate type memory cell and a floating gate. In addition, a memory cell of the flash memory 41 is a multi-bit cell that stores multi-bit data in one memory cell, such as a multiple level cell (MLC), a triple level cell (TLC), a quad level cell (QLC), or the like, for example. Here, the multi-bit cell is a memory cell capable of storing data having a plurality of bits in one memory cell by setting a plurality of data write thresholds.

The SSD controller 42 is, for example, a processor including a CPU, a ROM, a RAM, and the like (not illustrated), and comprehensively controls the SSD 40. The SSD controller 42 executes, for example, processing of a control process of a host interface (host I/F) with the chipset 21, a control process of a memory interface (memory I/F) with the flash memory 41, a data management process of the flash memory 41, and the like.

The SSD controller 42 controls, for example, a storage process of storing data in the multi-bit cell (a write process of writing the data) and a read process of reading the data from the multi-bit cell.

Next, a functional configuration of the information processing apparatus 1 according to one or more embodiments will be described with reference to FIG. 2.

Figure 2:
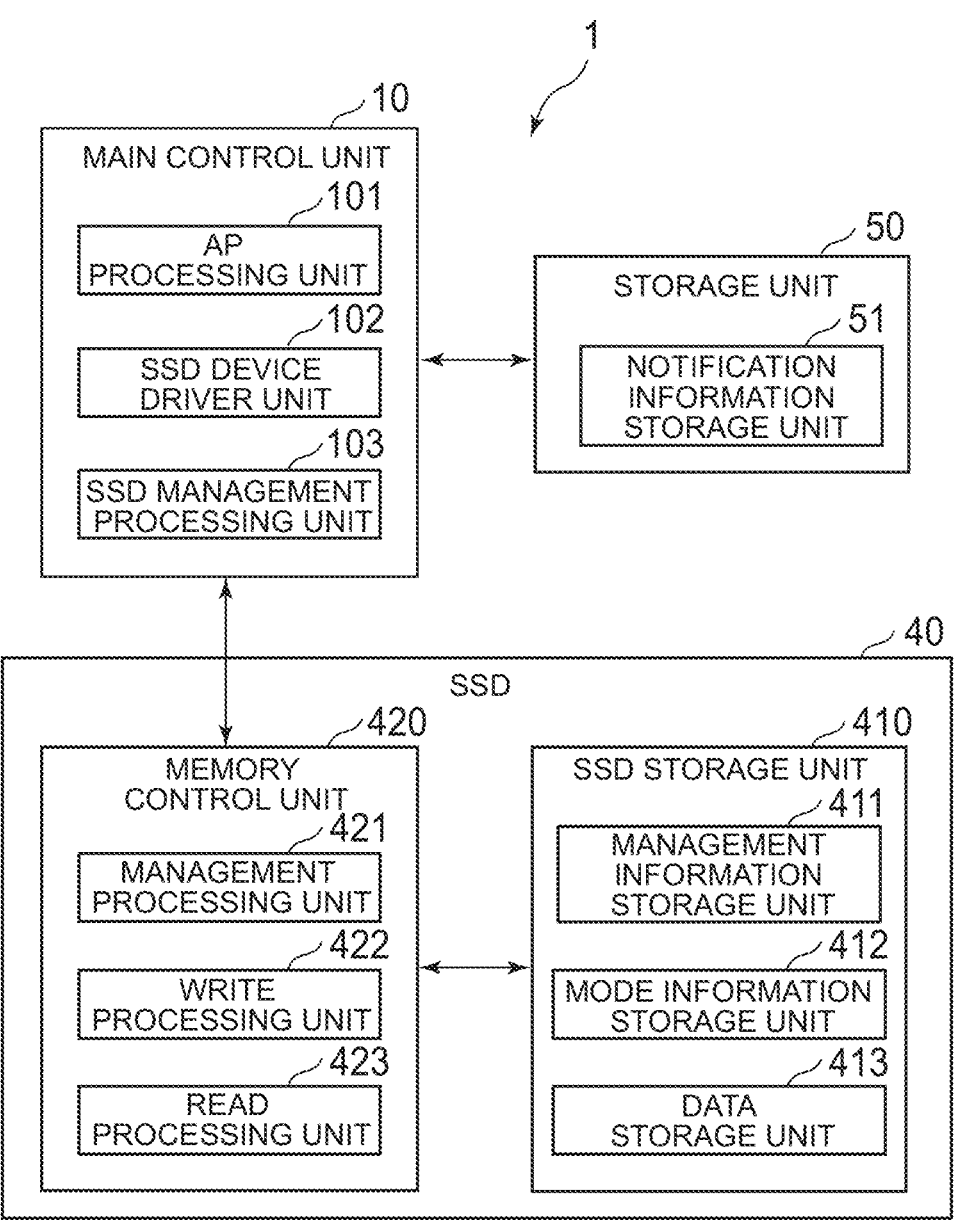
FIG. 2 is a functional block diagram illustrating an example of a functional configuration of the information processing apparatus according to the one or more embodiments.

FIG. 2 is a functional block diagram illustrating an example of a functional configuration of the information processing apparatus 1 according to one or more embodiments.

As illustrated in FIG. 2, the information processing apparatus 1 includes the main control unit 10, the SSD 40, and a storage unit 50. In addition, the SSD 40 includes an SSD storage unit 410 and a memory control unit 420.

The SSD storage unit 410 is, for example, a storage unit realized by the flash memory 41 of the SSD 40 and includes a management information storage unit 411, a mode information storage unit 412, and a data storage unit 413.

The management information storage unit 411 is, for example, a storage unit realized by a memory, such as a RAM (not illustrated) built in the flash memory 41 or the SSD controller 42, and stores management information of the SSD 40. The management information storage unit 411 stores, for example, conversion table information between a physical address of the flash memory 41 and a logical address (for example, LBA: logical block addressing (logical position information)), the management information of a free area and a used area of the flash memory 41, the number of rewrites for each block of the flash memory 41, and the like. Here, a block is a capacity unit in the flash memory 41 for erasing the data of the multi-bit cell in a batch. The flash memory 41 is capable of erasing and rewriting data in units of blocks.

In addition, the management information storage unit 411 stores mode information indicating a write mode (storage mode) for the multi-bit cell, together with the number of rewrites in units of blocks.

In one or more embodiments, the write mode (storage mode) includes a normal mode (normal storage mode) and a protection mode (high-quality storage mode), and the details thereof will be described later.

The mode information storage unit 412 is, for example, a storage unit realized by a memory, such as a RAM (not illustrated) built in the SSD controller 42, and stores write control information between the normal mode (normal storage mode) and the protection mode (high-quality storage mode). The write control information includes, for example, an application period (application time) of a divided write voltage, a variation range (allowable range) of Vth, and the like.

The normal mode (normal storage mode) is a mode in which the variation range (allowable range) of Vth is wider than in the protection mode (high-quality storage mode) and the write time required for writing is shorter than in the protection mode. In addition, the protection mode is a mode in which the variation range (allowable range) of Vth is narrower than in the normal storage mode and the write time required for writing is longer than in the normal storage mode.

The data storage unit 413 is, for example, a storage unit realized by the flash memory 41 and stores various types of data. The data storage unit 413 stores various types of data of the information processing apparatus 1, for example. The data storage unit 413 is accessed from the main control unit 10 by using an LBA set by a management processing unit 421, which will be described later.

The memory control unit 420 (an example of a storage control unit) is a functional unit realized by, for example, causing a CPU (not illustrated) of the SSD controller 42 to execute a program stored in a ROM (not illustrated). The memory control unit 420 controls the access to the SSD storage unit 410.

The memory control unit 420 executes, for example, the storage process through which the variation width of Vth (threshold voltage) is changeable when the multi-bit data is stored in the multi-bit cell of the SSD storage unit 410. The memory control unit 420 stores, when the multi-bit data is stored in the multi-bit cell, the multi-bit data with the protection mode (high-quality storage mode) in which the variation width of the threshold voltage is narrower than in the normal mode (normal storage mode) when the number of rewrites executed in the multi-bit cell is equal to or greater than a threshold number of rewrites.

The memory control unit 420, for example, acquires, when the multi-bit data is stored, the number of rewrites corresponding to the block in which the multi-bit data is stored from the management information storage unit 411, and stores the multi-bit data with the protection mode when the acquired number of rewrites is equal to or greater than the threshold number of rewrites.

Furthermore, when the protection mode is enabled, the memory control unit 420 notifies the main control unit 10 that the protection mode is enabled.

In addition, the memory control unit 420 includes a management processing unit 421, a write processing unit 422, and a read processing unit 423.

The management processing unit 421 manages the free area and the used area of the flash memory 41, and converts the LBA received from the main control unit 10 into a physical address by using a conversion table of the management information storage unit 411 to control the access to the flash memory 41.

In addition, when a write request is received from the main control unit 10, the management processing unit 421 updates the number of rewrites for the block corresponding to the LBA and stores the number of rewrites in the management information storage unit 411. In addition, when the number of rewrites reaches a preset threshold number of rewrites, the management processing unit 421 changes the write mode for the block from the normal mode to the protection mode, and notifies the main control unit 10 that the protection mode is enabled.

The write processing unit 422 executes a storage process (write process) of data in the multi-bit cell of the SSD storage unit 410. The write processing unit 422 executes a write process of data to the SSD storage unit 410 in units of blocks, for example. The write processing unit 422 acquires mode information corresponding to the block of the LBA for which the write process is performed from the management information storage unit 411, and executes the write process of the data by using the control information of the normal mode stored in the mode information storage unit 412 when the mode information is the normal mode. In addition, when the mode information is the protection mode, the write processing unit 422 executes the write process of the data by using the control information of the protection mode stored in the mode information storage unit 412.

Since the protection mode is permitted when the number of rewrites corresponding to the block is equal to or greater than a threshold number of rewrites, the write processing unit 422 executes the write process of the data when the number of rewrites is equal to or greater than the threshold number of rewrites by using the control information of the protection mode.

The write processing unit 422 executes an application process of applying a voltage for storing data in the multi-bit cell for a predetermined period obtained by dividing the application period in the protection mode and executes a checking process of checking whether or not Vth falls within the variation width of Vth after the application process is performed. The write processing unit 422 executes a repeating process of repeating the application process and the checking process until Vth falls within the variation width of Vth in the protection mode.

The read processing unit 423 reads the data of the designated LBA, which is designated from the main control unit 10, based on the management information stored in the management information storage unit 411 and outputs the data to the main control unit 10.

Figure 3:
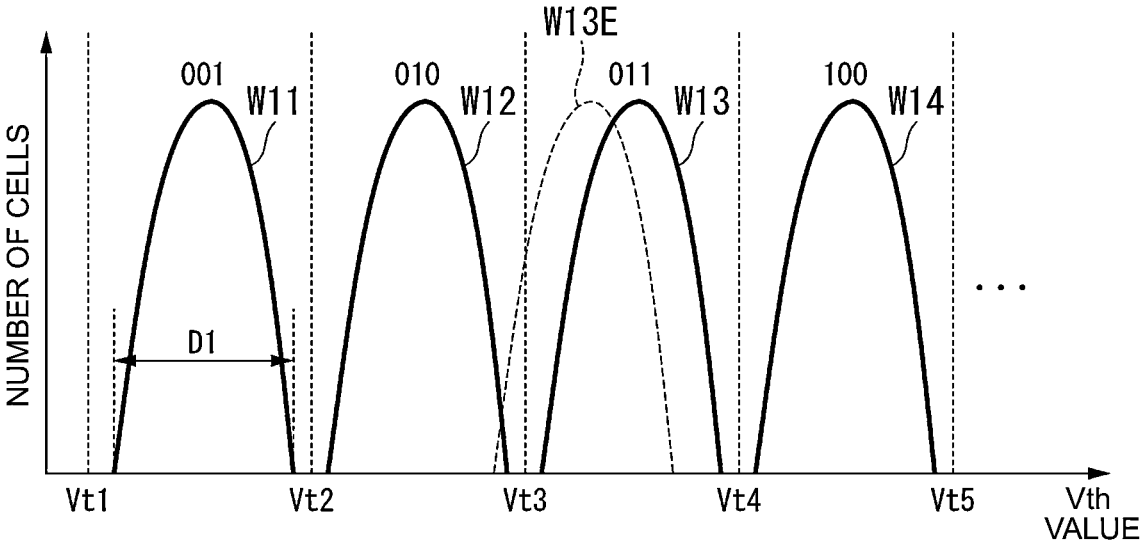
FIG. 3 is a diagram illustrating a distribution example of Vth in a normal mode of the SSD of the information processing apparatus according to one or more embodiments.

Next, a difference in storage process to the multi-bit cell between the above-described normal mode and a protection mode will be described with reference to FIGS. 3 and 4. FIG. 3 is a diagram illustrating a distribution example of Vth in a normal mode of the SSD 40 of the information processing apparatus 1 according to one or more embodiments.

In FIG. 3, a horizontal axis of a graph indicates Vth when the storage process (write process) is performed on each data in the normal mode, and a vertical axis indicates the number of cells.

In addition, in FIG. 3, a waveform W11 shows a Vth distribution when data "001" is stored in the multi-bit cell in the normal mode, and a waveform W12 shows a Vth distribution when data "010" is stored in the multi-bit cell in the normal mode. In addition, a waveform W13 shows a Vth distribution when the data "011" is stored in the multi-bit cell in the normal mode, and a waveform W14 shows a Vth distribution when the data "100" is stored in the multi-bit cell in the normal mode.

The write processing unit 422 executes the storage process (write process) of the data with a distribution having a variation width D1 of Vth as shown in the waveform W11 to the waveform W14 in FIG. 3 according to the write data (storage data), in the normal mode.

In addition, when the data is read from the multi-bit cell, the read processing unit 423 determines that the data is "001" when the Vth is between the voltage Vt1 and the voltage Vt2 and determines that the data is "010" when the Vth is between the voltage Vt2 and the voltage Vt3. In addition, when the data is read from the multi-bit cell, the read processing unit 423 determines that the data is "011" when the Vth is between the voltage Vt3 and the voltage Vt4 and determines that the data is "100" when the Vth is between the voltage Vt4 and the voltage Vt5.

It should be noted that the combination of Vth and the data is not limited to the examples described above, and various combinations are possible, and other combinations may also be used.

In addition, a waveform W13E shows an example in which Vth is moved to a lower side due to deterioration of the multi-bit cell or the elapse of time from the data writing. In this case, in some of the multi-bit cells, since Vth is lower than the voltage Vt3, data corruption occurs.

Figure 4:
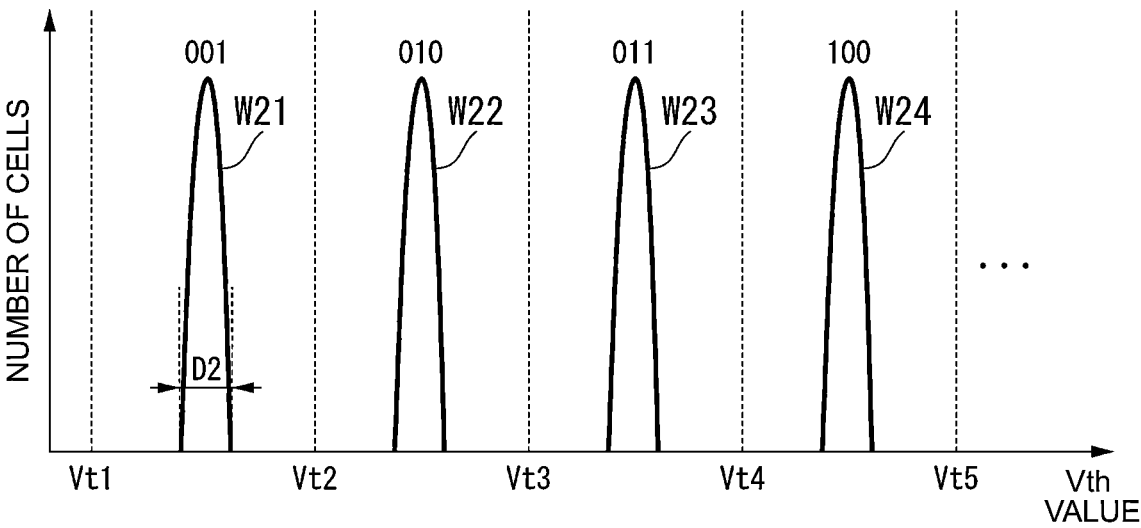
FIG. 4 is a diagram illustrating a distribution example of Vth in a protection mode of the SSD of the information processing apparatus according to one or more embodiments.

FIG. 4 is a diagram illustrating a distribution example of Vth in a protection mode of the SSD 40 of the information processing apparatus 1 according to one or more embodiments.

In FIG. 4, a horizontal axis of a graph indicates Vth when the storage process (write process) is performed on each data in the high-quality storage mode, and a vertical axis indicates the number of cells. In addition, in FIG. 4, a waveform W21 shows a Vth distribution when data "001" is stored in the multi-bit cell in the protection mode, and a waveform W22 shows a Vth distribution when data "010" is stored in the multi-bit cell in the protection mode. In addition, a waveform W23 shows a Vth distribution when the data "011" is stored in the multi-bit cell in the protection mode, and a waveform W24 shows a Vth distribution when the data "100" is stored in the multi-bit cell in the protection mode.

The write processing unit 422 executes the storage process of the data with a distribution having a variation width D2 of Vth as shown in the waveform W21 to the waveform W24 in FIG. 4 according to the write data (storage data), in the protection mode. It should be noted that the variation width D2 of Vth in the protection mode is narrower than the variation width D1 of Vth in the normal mode.

Returning to the description of FIG. 2 again, the storage unit 50 is, for example, a storage unit realized by the main memory 12 or the SSD 40, and stores various types of information used by the information processing apparatus 1. The storage unit 50 includes a notification information storage unit 51.

The notification information storage unit 51 is, for example, a storage unit realized by the main memory 12, and stores notification information indicating that the protection mode is enabled. The notification information may include information indicating a proportion of a storage capacity of the SSD 40 in which the protection mode is enabled.

The main control unit 10 is a functional unit realized by the CPU 11 and the chipset 21 executing a program stored in the main memory 12 and executes various processes based on the OS. The main control unit 10 executes various processes based on the data stored in the SSD 40, for example. The main control unit 10 includes an AP processing unit 101, an SSD device driver unit 102, and an SSD management processing unit 103.

The AP processing unit 101 is a functional unit that processes an application program executed on the OS. The AP processing unit 101 performs, for example, the write process and read process of various application data to and from the data storage unit 413 of the SSD 40. When accessing the data storage unit 413, the AP processing unit 101 accesses the data storage unit 413 by using the LBA. The AP processing unit 101 accesses the SSD 40 via an SSD device driver unit 102, which will be described later.

The SSD device driver unit 102 is a functional unit that realizes a device driver for accessing the SSD 40. The SSD device driver unit 102 transmits a write request for storing (writing) the data of the designated LBA to the SSD 40 and stores the data in the designated LBA. In addition, the SSD device driver unit 102 transmits a read request for reading the data of the designated LBA to the SSD 40 and reads the data of the designated LBA.

The SSD management processing unit 103 is, for example, a functional unit realized by executing a resident program that manages the SSD 40 executed on the OS. The SSD management processing unit 103 outputs, for example, a notification to the user indicating that the protection mode is enabled when the notification indicating that the protection mode is enabled is received from the SSD 40. The SSD management processing unit 103 displays, for example, the notification information stored in the notification information storage unit 51 on the display unit 14.

It should be noted that the SSD management processing unit 103 may display the notification on the display unit 14 when the protection mode is enabled in a proportion equal to or greater than a predetermined proportion of the storage capacity of the SSD 40. In addition, in this case, the SSD management processing unit 103 may display, as the notification, information on the display unit 14 indicating the proportion of the storage capacity of the SSD 40 in which the protection mode is enabled.

Figure 5:
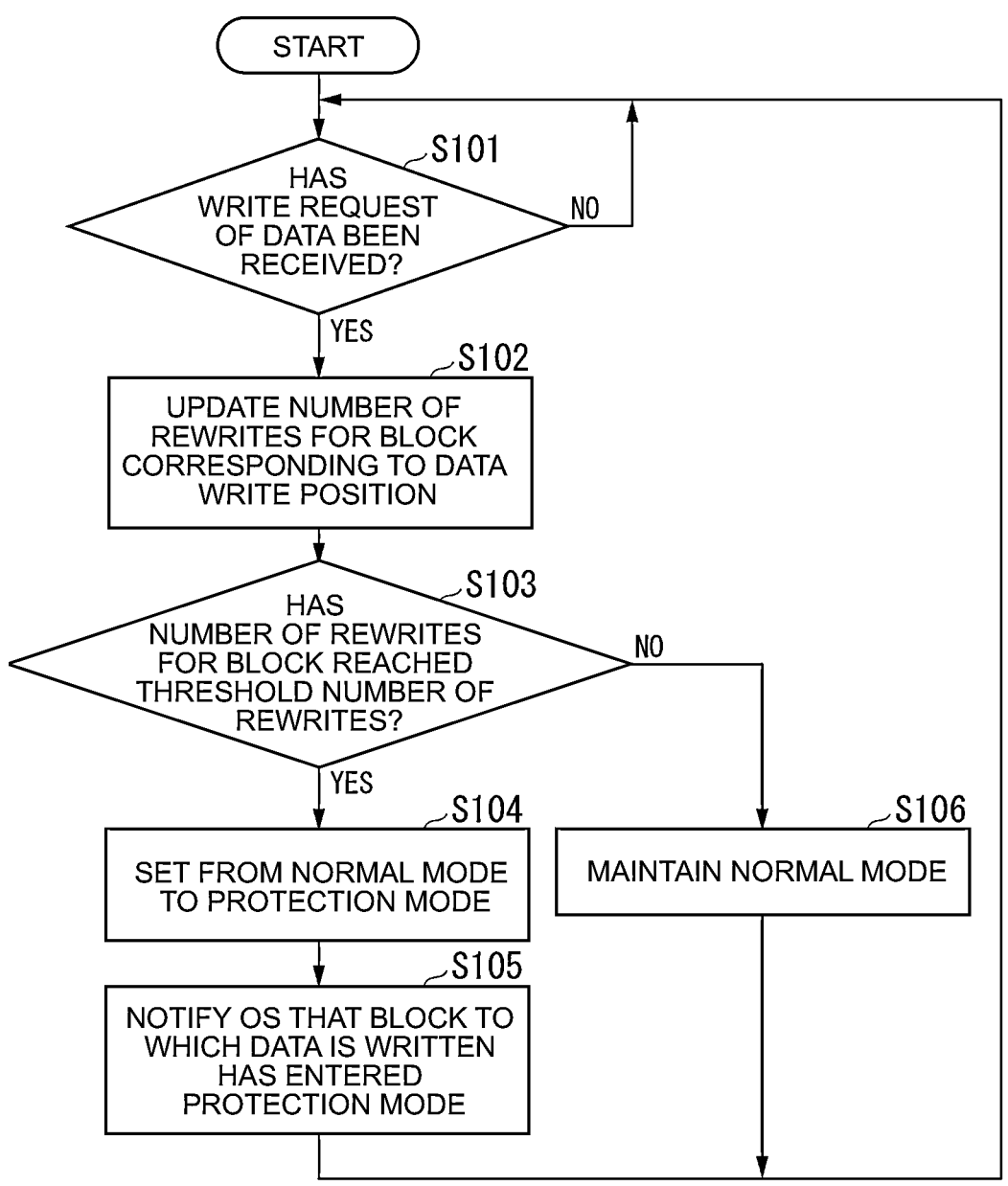
FIG. 5 is a flowchart illustrating an example of a switching process of a write mode of the SSD in one or more embodiments.

Next, an operation of the information processing apparatus 1 according to one or more embodiments will be described with reference to the drawings. FIG. 5 is a flowchart illustrating an example of a switching process of a write mode of the SSD 40 in one or more embodiments.

As illustrated in FIG. 5, the memory control unit 420 of the SSD 40 first determines whether a write request of the data has been received (step S101). The management processing unit 421 of the memory control unit 420 determines whether a write request of the data has been received from the main control unit 10. When the write request of the data is received from the main control unit 10 (step S101: YES), the management processing unit 421 proceeds the processing to step S102. In addition, when the write request of the data is not received from the main control unit 10 (step S101: NO), the management processing unit 421 returns the processing to step S101.

In step S102, the management processing unit 421 updates the number of rewrites for the block corresponding to the data write position. The management processing unit 421 acquires the number of rewrites for the block from the management information storage unit 411 in a case of, for example, performing an erasing process in the block corresponding to the designated LBA, which is designated by the write request of the data, adds "1" to the number of rewrites, and stores and updates the number of rewrites in the management information storage unit 411.

Next, the management processing unit 421 determines whether the number of rewrites for the block has reached a threshold number of rewrites (step S103). When the updated number of rewrites reaches the threshold number of rewrites (number of rewrites=threshold number of rewrites) (step S103: YES), the management processing unit 421 proceeds the processing to step S104. In addition, when the updated number of rewrites has not reached the threshold number of rewrites (when the number of rewrites is equal to or less than the threshold number of rewrites) (step S103: NO), the management processing unit 421 proceeds the processing to step S106.

In step S104, the management processing unit 421 sets the normal mode to the protection mode. The management processing unit 421 changes the mode information corresponding to the block of the management information storage unit 411 from the normal mode to the protection mode. Next, the management processing unit 421 notifies the OS that the block to which data is written has entered the protection mode (step S105). The management processing unit 421 transmits a notification to the main control unit 10 indicating that the block to which data is written has entered the protection mode. After the processing of step S105, the management processing unit 421 returns the processing to step S101.

In addition, in step S106, the management processing unit 421 maintains the normal mode. After the processing of step S106, the management processing unit 421 returns the processing to step S101.

Next, a write process of the SSD 40 will be described with reference to FIG. 6.

Figure 6:
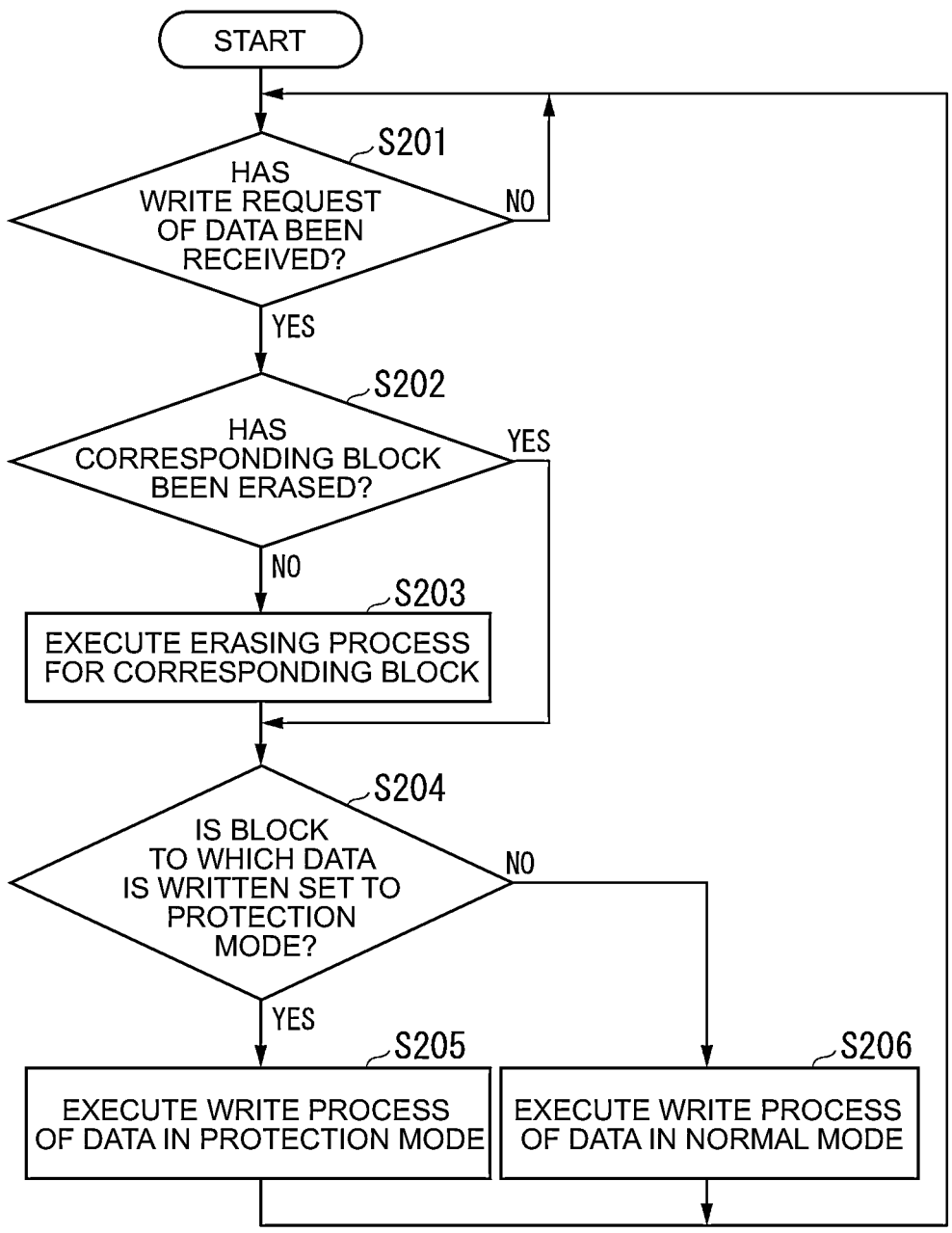
FIG. 6 is a flowchart illustrating an example of a write process of the SSD in one or more embodiments.

FIG. 6 is a flowchart illustrating an example of a write process of the SSD 40 in one or more embodiments.

As illustrated in FIG. 6, the write processing unit 422 of the memory control unit 420 determines whether a write request of the data has been received (step S201). When the write request of the data is received from the main control unit 10 (step S201: YES), the write processing unit 422 proceeds the processing to step S202. In addition, when the write request of the data is not received from the main control unit 10 (step S201: NO), the write processing unit 422 returns the processing to step S201.

In step S202, the write processing unit 422 determines whether the corresponding block has been erased. When the block corresponding to the designated LBA has been erased (step S202: YES), the write processing unit 422 proceeds the processing to step S204. When the block corresponding to the designated LBA has not been erased (step S202: NO), the write processing unit 422 proceeds the processing to step S203.

In step S203, the write processing unit 422 executes an erasing process for the corresponding block. The write processing unit 422 executes the erasing processing in units of blocks.

In addition, in step S204, the write processing unit 422 determines whether the block to which data is written is set in the protection mode. The write processing unit 422 checks the mode information corresponding to the block of the management information storage unit 411, and determines whether the block is set to the protection mode. When the block is set to the protection mode (step S204: YES), the write processing unit 422 proceeds the processing to step S205. In addition, when the block is not set to the protection mode (step S204: NO), the write processing unit 422 proceeds the processing to step S206.

In step S205, the write process of the data is executed in the protection mode. The write processing unit 422 acquires the setting information of the protection mode from the mode information storage unit 412 and executes a storage process (write process) of the protection mode as illustrated in FIG. 4, in accordance with the setting information. After the processing of step S205, the write processing unit 422 returns the processing to step S201.

In step S206, the write process of the data is executed in the normal mode. The write processing unit 422 acquires the setting information of the normal mode from the mode information storage unit 412 and executes the storage process (write process) of the normal mode as illustrated in FIG. 3, in accordance with the setting information. After the processing of step S206, the write processing unit 422 returns the processing to step S201.

Next, a description of details of a storage process of the protection mode, which is the processing of step S205 described above, will be made with reference to FIG. 7.

Figure 7:
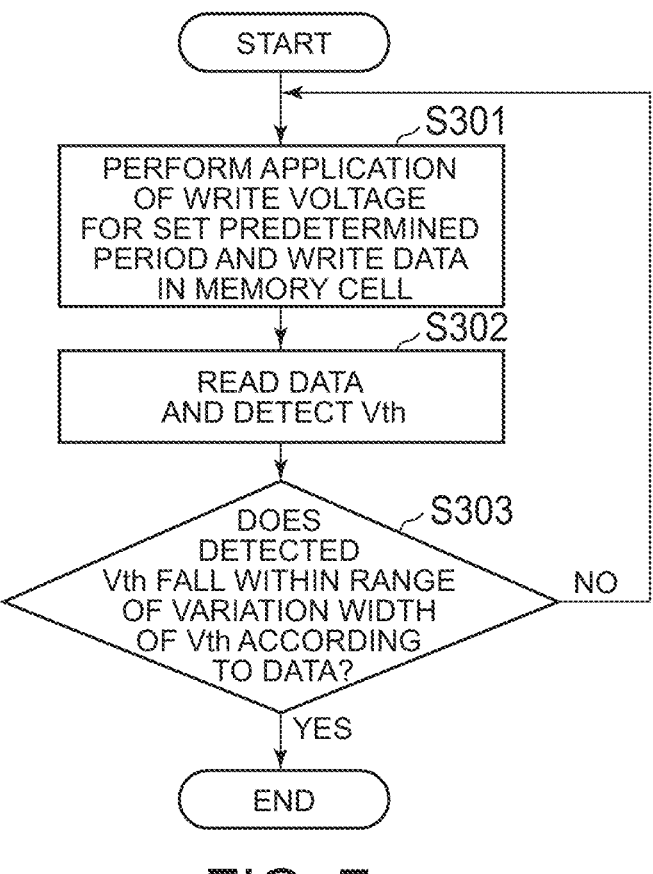
FIG. 7 is a flowchart illustrating an example of a storage process of the protection mode by the information processing apparatus according to one or more embodiments.

FIG. 7 is a flowchart illustrating an example of the storage process of the protection mode by the information processing apparatus 1 according to one or more embodiments.

As illustrated in FIG. 7, the write processing unit 422 of the memory control unit 420 performs application of the write voltage for the set predetermined period and writes data in the memory cell (step S301). The write processing unit 422 applies the write voltage to the multi-bit cell of the designated LBA for the application period (predetermined period) of the protection mode stored in the mode information storage unit 412.

Next, the write processing unit 422 reads the data and detects Vth (step S302). The write processing unit 422 executes the read checking and detects the written Vth.

Next, the write processing unit 422 determines whether or not the variation width of Vth according to the data falls within the range (step S303). The write processing unit 422 determines whether or not the detected Vth falls within the range (within an allowable range) of the variation width of Vth according to the write data (checking process). When the detected Vth falls within the variation width of Vth according to the write data (step S303: YES), the write processing unit 422 ends the storage process (write process). In addition, when the detected Vth is not within the variation width of Vth according to the write data (step S303: NO), the write processing unit 422 returns the processing to step S301.

As described above, the write processing unit 422 repeats the processing of step S301 and step S302 until Vth falls within the range of the variation width of Vth according to the write data. As a result, the write processing unit 422 executes writing of the variation width D2 of Vth as illustrated in FIG. 4 described above.

The write processing unit 422 may execute the same processing as that described with reference to FIG. 8 in the normal mode by widening the predetermined period and the range of the variation width of Vth more than in the protection mode. In addition, the write processing unit 422 may execute the storage process (write process) in a preset single write voltage application period in the normal mode.

Next, a notification process by the information processing apparatus according to one or more embodiments will be described with reference to FIGS. 8 and 9.

Figure 8:
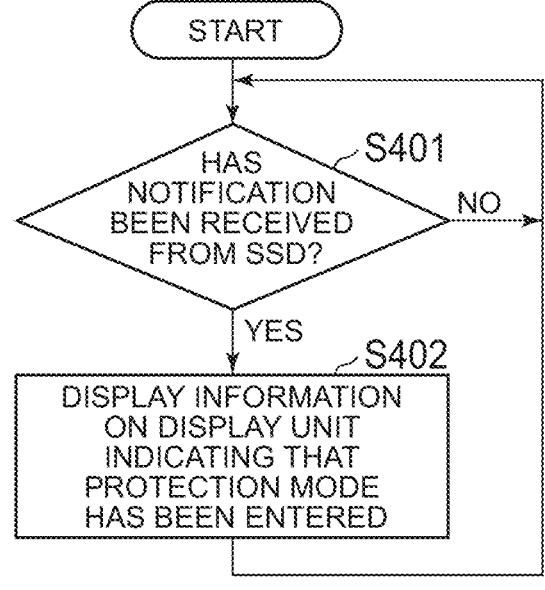
FIG. 8 is a flowchart illustrating an example of a notification process by the information processing apparatus according to one or more embodiments.

FIG. 8 is a flowchart illustrating an example of the notification process by the information processing apparatus 1 according to one or more embodiments.

As illustrated in FIG. 8, the main control unit 10 of the information processing apparatus 1 determines whether a notification has been received from the SSD 40 (step S401). It should be noted that the notification here is a notification indicating that the block to which data is written has entered the protection mode. When the notification indicating that the protection mode has been entered is received, the SSD management processing unit 103 of the main control unit 10 proceeds the processing to step S402 (step S401: YES). When the notification indicating that the protection mode has been entered is not received, the SSD management processing unit 103 returns the processing to step S401 (step S401: NO).

In step S402, the SSD management processing unit 103 displays the information on the display unit 14 indicating that the protection mode has been entered. The SSD management processing unit 103 acquires, for example, notification information indicating that the protection mode, which is stored in the notification information storage unit 51, has been entered, and displays the notification information on the display unit 14. After the processing of step S402, the SSD management processing unit 103 returns the processing to step S401.

Figure 9:
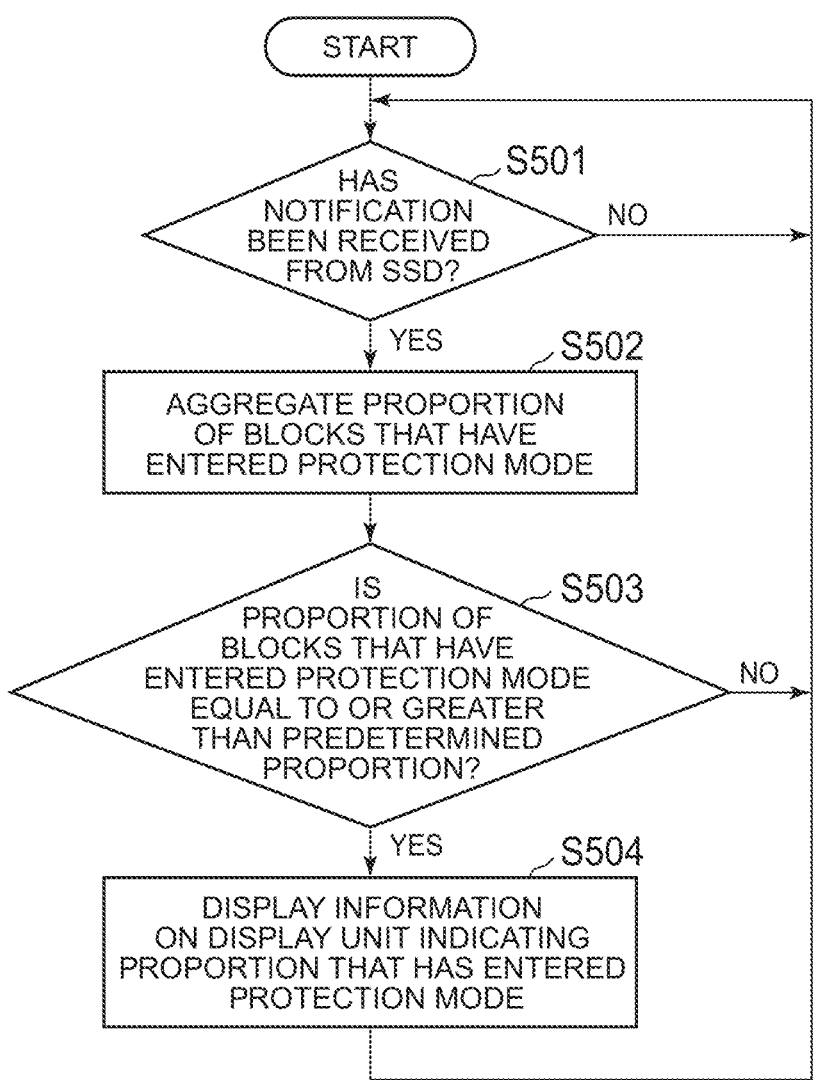
FIG. 9 is a flowchart illustrating another example of the notification process by the information processing apparatus according to one or more embodiments.

In addition, FIG. 9 is a flowchart illustrating another example of the notification process by the information processing apparatus 1 according to one or more embodiments.

As illustrated in FIG. 9, the main control unit 10 of the information processing apparatus 1 determines whether a notification has been received from the SSD 40 (step S501). It should be noted that the notification here is a notification indicating that the block to which data is written has entered the protection mode, as in FIG. 8 described above. When the notification indicating that the protection mode has been entered is received, the SSD management processing unit

103 of the main control unit 10 proceeds the processing to step 502 (step S501: YES). When the notification indicating that the protection mode has been entered is not received, the SSD management processing unit 103 returns the processing to step S501 (step S501: NO).

In step S502, the SSD management processing unit 103 aggregates a proportion of blocks that have entered the protection mode. The SSD management processing unit 103 aggregates the proportion of blocks that have entered the protection mode of the storage capacity of the SSD 40.

Next, the SSD management processing unit 103 determines whether the proportion of blocks that have entered the protection mode is equal to or greater than a predetermined proportion (step S503). When the proportion of blocks that have entered the protection mode is equal to or greater than the predetermined proportion (step S503: YES), the SSD management processing unit 103 proceeds the processing to step S504. In addition, when the proportion of blocks that have entered the protection mode is less than the predetermined proportion (step S503: NO), the SSD management processing unit 103 returns the processing to step S501.

In step S504, the SSD management processing unit 103 displays information on the display unit 14 indicating the proportion of blocks that have entered the protection mode. The SSD management processing unit 103 may acquire notification information indicating that the protection mode, which is stored in the notification information storage unit 51, has been entered, and may display the notification information on the display unit 14 together with information indicating the proportion of blocks. After the processing of step S504, the SSD management processing unit 103 returns the processing to step S501.

As described above, the information processing apparatus 1 according to one or more embodiments includes the SSD 40 and the main control unit 10. The SSD 40 is configured with a multi-bit cell for storing multi-bit data in one memory cell and includes an electrically rewritable SSD storage unit 410 (non-volatile storage unit). The main control unit 10 executes processing based on the data stored in the SSD 40. The SSD 40 includes the memory control unit 420 (storage control unit) that controls access to the SSD storage unit 410. The memory control unit 420 stores, when the multi-bit data is stored in the multi-bit cell, the multi-bit data with the protection mode (high-quality storage mode) in which the variation width of the threshold voltage is narrower than in the normal mode (normal storage mode) when the number of rewrites executed in the multi-bit cell is equal to or greater than a threshold number of rewrites.

With this, since the information processing apparatus 1 according to one or more embodiments stores the multi-bit data with the protection mode (high-quality storage mode) in which the variation width of the threshold voltage is narrow when the number of rewrites is equal to or greater than the threshold number of rewrites, it is possible to reduce data corruption of the SSD 40 and guarantee the data retention period. The information processing apparatus 1 according to one or more embodiments, for example, can guarantee a long data retention period of three to five years during a powered-off state (a state in which no power is being supplied to the SSD 40) by enabling the protection mode, even when, for example, the user has used the information processing apparatus 1 for a long period of time or is a heavy user who rewrites a large amount of data.

In addition, in one or more embodiments, the SSD 40 includes a management information storage unit 411 (rewrite number storage unit) that stores the number of rewrites in units of blocks, where the data of the multi-bit cell is erased in a batch. The memory control unit 420 acquires, when the multi-bit data is stored, the number of rewrites corresponding to the block in which the multi-bit data is stored from the management information storage unit 411, and stores the multi-bit data with the protection mode when the acquired number of rewrites is equal to or greater than the threshold number of rewrites.

With this, the information processing apparatus 1 according to one or more embodiments can appropriately change the protection mode by using a simple configuration because the number of rewrites is managed in units of blocks, where the data of the multi-bit cell is erased in a batch. Therefore, the information processing apparatus 1 according to one or more embodiments can guarantee the data retention period for a long period of time by using a simple configuration.

In addition, in one or more embodiments, the memory control unit 420 executes the repeating process of repeating the application process and the checking process in the protection mode (high-quality storage mode). In the application process, the memory control unit 420 performs application of a voltage for storing data in the multi-bit cell, for a predetermined period obtained by dividing the application period. In the checking process, the memory control unit 420 checks whether or not Vth falls within the variation width of Vth after the application process is performed. In the repeating process, the memory control unit 420 repeats the application process and the checking process until Vth falls within the variation width of Vth.

As a result, since the information processing apparatus 1 according to one or more embodiments divides the multi-bit cell into a predetermined period to perform application of a voltage for storing the data and repeat while checking Vth, the information processing apparatus 1 is capable of performing the storage process in the protection mode (high-quality storage mode) in which the variation width of Vth is narrowed, by using a simple method.

In addition, in one or more embodiments, when the protection mode is enabled, the memory control unit 420 notifies the main control unit 10 that the protection mode is enabled. The main control unit 10 outputs a notification to the user indicating that the protection mode is enabled.

With this, the information processing apparatus 1 according to one or more embodiments enables the user to be aware that the protection mode is enabled, and enables the user to appropriately consider actions such as replacing the SSD 40.

In addition, in one or more embodiments, the main control unit 10 displays the notification on the display unit 14 when the protection mode is enabled in a proportion equal to or greater than a predetermined proportion of a storage capacity of the SSD 40.

With this, the information processing apparatus 1 according to one or more embodiments enables the user to recognize the degree of deterioration of the SSD 40, and it is possible to prompt the user to replace the SSD 40.

In addition, in one or more embodiments, the main control unit 10 displays, as the notification, information on the display unit 14 indicating the proportion of the storage capacity of the SSD 40 in which the protection mode is enabled.

With this, in the information processing apparatus 1 according to one or more embodiments, the main control unit 10 displays the information on the display unit 14 indicating the proportion in which the protection mode is enabled, so that the user can quantitatively recognize the degree of deterioration of the SSD 40, and it is possible to prompt the user to replace the SSD 40.

In addition, the control method according to one or more embodiments is a control method of the information processing apparatus 1 including the SSD 40 and the main control unit 10, and includes a write process step. The SSD 40 is configured with a multi-bit cell for storing multi-bit data in one memory cell and includes an electrically rewritable SSD storage unit 410. The main control unit 10 executes processing based on the data stored in the SSD 40. The memory control unit 420 of the SSD 40 controls the access to the SSD storage unit 410. In the write process step, the memory control unit 420 stores, when the multi-bit data is stored in the multi-bit cell, the multi-bit data with the protection mode in which the variation width of the threshold voltage is narrower than in the normal mode when the number of rewrites executed in the multi-bit cell is equal to or greater than a threshold number of rewrites.

With this, the control method according to one or more embodiments has the same effects as the information processing apparatus 1 described above, and can reduce the data corruption of the SSD and guarantee the data retention period.

It should be noted that the present invention is not limited to each of the embodiments described above, and the present invention can be modified without departing from the gist of the present invention.

For example, in the above-described embodiments, although an example has been described in which the information processing apparatus 1 is a laptop personal computer (mobile computer), the present disclosure is not limited to this, and the information processing apparatus 1 may be another information processing apparatus, such as a desktop type personal computer or a tablet terminal device.

In addition, in the embodiments described above, although the example has been described in which the information processing apparatus 1 uses two types of write processes (storage processes) by switching between the normal mode and the protection mode, the information processing apparatus 1 may provide three or more storage modes with a variation width of Vth and use storage processes by switching the storage modes, depending on the purpose.

In addition, in the embodiments described above, the information processing apparatus 1 (for example, the main control unit 10 or the embedded controller 31) may perform a part of the processing of the memory control unit 420 of the SSD 40. In addition, a part of the processing of the main control unit 10 may be executed by the memory control unit 420. For example, in the present embodiments described above, an example has been described in which the main control unit 10 aggregates the proportion in which the protection mode is enabled, but the present disclosure is not limited to this, and the memory control unit 420 may aggregate the proportion and notify the main control unit 10.

In addition, in the embodiments described above, although the example has been described in which the multi-bit cell is any of an MLC, a TLC, or a QLC, the present disclosure is not limited to this, and the multi-bit cell may be another multi-bit cell.

In addition, the deterioration of the cell is not limited to the multi-bit cell, but also occurs in a single-bit cell (single level cell (SLC)). Therefore, the present invention may be applied to the single-level cell (SLC).

In addition, in the embodiments described above, although the information processing apparatus 1 has been described as a personal computer-based configuration example including the embedded controller 31, the present disclosure is not limited to this, and the information processing apparatus 1 may have a configuration that does not include the embedded controller 31. In addition, the OS of the information processing apparatus 1 is not limited to Windows (registered trademark) and may be applied to other OSs, such as Android (registered trademark) and iOS (registered trademark).

Each of the components included in the information processing apparatus 1 and the SSD 40 described above includes a computer system therein. The processing in each of the components included in the information processing apparatus 1 and the SSD 40 described above may be performed by recording a program, which is for realizing the function of each component included in the information processing apparatus 1 and the SSD 40 described above, on a computer-readable recording medium, and reading the program, which is recorded on the recording medium, with the computer system to execute the program. Here, "reading the program, which is recorded on the recording medium, with the computer system to execute the program" includes installing the program in the computer system. The "computer system" herein includes the OS or hardware such as peripheral devices.

In addition, the "computer system" may include a plurality of computer apparatuses connected via a network including a communication line such as the Internet, a WAN, a LAN, or a dedicated line. In addition, the "computer-readable recording medium" is a portable medium such as a flexible disk, a magneto-optical disk, a ROM, or a CD-ROM, and a storage device such as a hard disk built into the computer system. As described above, the recording medium that stores the program may be a non-transitory recording medium such as a CD-ROM.

In addition, the recording medium also includes an internal or external recording medium that can be accessed from a distribution server to distribute the program. It should be noted that a configuration may be used in which the program is divided into a plurality of programs, downloaded at different timings, and then combined with each configuration of the information processing apparatus 1 and the SSD 40, or distribution servers for distributing the respective divided programs may be different. Further, the "computer-readable recording medium" includes a medium, which holds the program for a certain period of time, such as a volatile memory (RAM) inside the computer system that serves as a server or a client when the program is transmitted via the network. The above-described program may be a program for realizing a part of the above-described functions. Further, the program may be a so-called difference file (difference program) in which the above-described functions can be realized in combination with the program already recorded in the computer system.

Further, a part or all of the above-described functions may be realized as an integrated circuit such as a large scale integration (LSI). Each function described above may be individually realized as a processor, and a part or all of the functions may be integrated into a processor. A method of forming an integrated circuit is not limited to the LSI and may be realized by a dedicated circuit or a general-purpose processor. When an integrated circuit technique that replaces an LSI will appear due to advances in semiconductor technique, an integrated circuit based on the technique may be used.

DESCRIPTION OF SYMBOLS

1 information processing apparatus
10 main control unit

11 CPU
12 main memory
13 video subsystem
14 display unit
21 chipset
22 BIOS memory
31 embedded controller (EC)
32 input unit
33 power supply circuit
40 SSD
41 flash memory
42 SSD controller
50 storage unit
51 notification information storage unit
101 AP processing unit
102 SSD device driver unit
103 SSD management processing unit
410 SSD storage unit
411 management information storage unit
412 mode information storage unit
413 data storage unit
420 memory control unit
421 management processing unit
422 write processing unit
423 read processing unit

What is claimed is:

1. An information processing apparatus comprising:
a solid state drive (SSD) configured with a multi-bit cell for storing multi-bit data in one memory cell and configured to include an electrically rewritable non-volatile storage unit; and
a main control unit configured to execute processing based on data stored in the SSD,
wherein the SSD includes a storage control unit configured to:
control access to the non-volatile storage unit using:
a first mode with a first variation width of a threshold voltage; and
a second mode with a second variation width of the threshold voltage that is narrower than the first variation width;
when a number of rewrites executed in the multi-bit cell is less than a threshold number of rewrites, store the multi-bit data using the first mode; and
when the number of rewrites executed in the multi-bit cell is equal to or greater than the threshold number of rewrites, store the multi-bit data using the second mode, and
wherein the storage control unit is configured to execute, in the second mode,
an application process of applying a voltage for storing the data to the multi-bit cell for a predetermined period,
a checking process of checking whether or not the threshold voltage falls within the second variation width of the threshold voltage, after the application process is performed, and
a repeating process of repeating the application process and the checking process until the threshold voltage falls within the second variation width of the threshold voltage.

2. The information processing apparatus according to claim 1,
wherein the SSD includes a rewrite number storage unit configured to store the number of rewrites in units of blocks, where the data of the multi-bit cell is erased in a batch, and the storage control unit is configured to:

when the multi-bit data is stored, acquire the number of rewrites corresponding to the block in which the multi-bit data is stored from the rewrite number storage unit; and when the acquired number of rewrites is equal to or greater than the threshold number of rewrites, store the multi-bit data using the second mode.

3. The information processing apparatus according to claim 1, wherein the storage control unit is configured to notify the main control unit that the second mode is enabled when the second mode is enabled, and the main control unit is configured to output a notification to a user indicating that the second mode is enabled.

4. The information processing apparatus according to claim 3, wherein the main control unit is configured to display the notification on a display unit when a proportion of a storage capacity of the SSD that uses the second mode is equal to or greater than a predetermined proportion of the storage capacity of the SSD.

5. The information processing apparatus according to claim 4, wherein the main control unit is configured to display, as the notification, information on the display unit indicating the proportion of the storage capacity of the SSD that uses the second mode.

6. A control method of an information processing apparatus including a solid state drive (SSD) configured with a multi-bit cell for storing multi-bit data in one memory cell and configured to include an electrically rewritable non-volatile storage unit, and a main control unit configured to execute processing based on data stored in the SSD, the control method comprising:

a step of causing a storage control unit of the SSD to control access to the non-volatile storage unit using:

a first mode with a first variation width of a threshold voltage; and a second mode with a second variation width of the threshold voltage that is narrower than the first variation width, wherein when a number of rewrites executed in the multi-bit cell is less than a threshold number of rewrites, store the multi-bit data using the first mode, and when the number of rewrites executed in the multi-bit cell is equal to or greater than the threshold number of rewrites, store the multi-bit data using the second mode, and wherein the storage control unit is configured to execute, in the second mode, an application process of applying a voltage for storing the data to the multi-bit cell for a predetermined period, a checking process of checking whether or not the threshold voltage falls within the second variation width of the threshold voltage, after the application process is performed, and a repeating process of repeating the application process and the checking process until the threshold voltage falls within the second variation width of the threshold voltage.

* * * * *